(12) United States Patent
Yifrah

(10) Patent No.: US 11,643,123 B2
(45) Date of Patent: May 9, 2023

(54) STEERABLE MULTI-TERRAIN CART AND METHOD THEREFOR

(71) Applicant: Nir Yifrah, Moshav Yesha (IL)

(72) Inventor: Nir Yifrah, Moshav Yesha (IL)

( * ) Notice: Subject to any disclaimer, the term of this patent is extended or adjusted under 35 U.S.C. 154(b) by 306 days.

(21) Appl. No.: 16/954,735

(22) PCT Filed: Dec. 19, 2018

(86) PCT No.: PCT/IL2018/051376
§ 371 (c)(1),
(2) Date: Jun. 17, 2020

(87) PCT Pub. No.: WO2019/123461
PCT Pub. Date: Jun. 27, 2019

(65) Prior Publication Data
US 2021/0086813 A1  Mar. 25, 2021

(30) Foreign Application Priority Data

Dec. 19, 2017 (IL) .......................................... 256426

(51) Int. Cl.
   *B62B 3/02* (2006.01)
   *B62B 3/00* (2006.01)
   *B62B 5/00* (2006.01)

(52) U.S. Cl.
   CPC ................ *B62B 3/02* (2013.01); *B62B 3/001* (2013.01); *B62B 3/008* (2013.01); *B62B 5/0046* (2013.01); *B62B 5/0053* (2013.01); *B62B 5/0059* (2013.01)

(58) Field of Classification Search
   CPC ....... B60D 1/665; B62B 3/001; B62B 5/0083; B62B 5/0089; B62B 5/0086; B62B 5/0093; B62D 61/12; B62D 61/125
   (Continued)

(56) References Cited

U.S. PATENT DOCUMENTS 2,929,079 A * 3/1960 Totten ..................... B63C 13/00
                                                          114/344
3,380,546 A * 4/1968 Rabjohn ............... B62B 5/0026
                                                          180/19.2
(Continued)

FOREIGN PATENT DOCUMENTS

GB      2515480 A    12/2014

OTHER PUBLICATIONS

Communication and Supplementary European Search Report for EP 18 89 2923 (a counter-part foreign application), dated Aug. 12, 2021 (7 pages).
(Continued)

*Primary Examiner* — Jeffrey J Restifo
(74) *Attorney, Agent, or Firm* — Roach Brown McCarthy & Gruber, P.C.; Kevin D. McCarthy

(57) ABSTRACT

A multi-terrain cart, comprising a cart body, two front and two rear non-pivoting wheels, a swivel wheel positioned forwardly or rearwardly to the front and rear non-pivoting wheels, respectively, an actuator for applying a downward force to the swivel wheel which causes the swivel wheel to be set at an operative position and two of the non-pivoting wheels to be raised relative to an underlying ground surface, and means for setting an angle of the swivel wheel relative to a lengthwise extending centerline of the cart body to cause the cart to rotate about a center of rotation that is determined by the set angle of the swivel wheel.

20 Claims, 10 Drawing Sheets

(58) Field of Classification Search
USPC .......................................................... 280/38
See application file for complete search history.

(56) References Cited

U.S. PATENT DOCUMENTS

| | | | | |
|---|---|---|---|---|
| 3,841,663 A * | 10/1974 | Proffit | ..................... | B60D 1/66 |
| | | | | 248/188.4 |
| 4,036,507 A * | 7/1977 | Henderson | ............. | B63C 13/00 |
| | | | | 114/344 |
| 4,318,196 A * | 3/1982 | Eide | ....................... | B63C 13/00 |
| | | | | 114/344 |
| 4,392,541 A * | 7/1983 | Barchard | .................. | B66F 9/06 |
| | | | | 180/209 |
| 4,480,578 A * | 11/1984 | Fisher | ..................... | B63C 13/00 |
| | | | | 114/344 |
| 4,892,155 A * | 1/1990 | Wanamaker | .......... | E02F 3/3414 |
| | | | | 172/199 |
| 5,338,047 A * | 8/1994 | Knisley | .................... | B60S 9/21 |
| | | | | 280/475 |
| 5,765,842 A * | 6/1998 | Phaneuf | .................. | B62B 3/001 |
| | | | | 280/47.35 |
| 6,182,997 B1 * | 2/2001 | Ullrich | ..................... | B60D 1/50 |
| | | | | 280/767 |
| 6,439,332 B1 * | 8/2002 | Meurer | ..................... | B60S 9/20 |
| | | | | 180/209 |
| 6,585,071 B2 * | 7/2003 | Meurer | .................. | B62D 61/12 |
| | | | | 180/209 |
| 8,091,903 B2 * | 1/2012 | Barrott | .................... | B63C 13/00 |
| | | | | 114/344 |
| 8,485,538 B1 * | 7/2013 | Strong | ................... | B62D 61/12 |
| | | | | 180/209 |
| 10,807,626 B2 * | 10/2020 | Price | ......................... | B62B 5/04 |
| 2002/0139595 A1 * | 10/2002 | Whelan | ..................... | E02F 9/02 |
| | | | | 180/209 |
| 2009/0057633 A1 * | 3/2009 | Beck | ......................... | B60S 9/18 |
| | | | | 280/475 |
| 2012/0187658 A1 * | 7/2012 | Wheeler | ................ | B60D 1/665 |
| | | | | 280/415.1 |
| 2013/0049316 A1 * | 2/2013 | Schwinn | ................ | B62D 61/12 |
| | | | | 280/86.5 |
| 2014/0375005 A1 * | 12/2014 | Lin | ......................... | B62B 3/008 |
| | | | | 280/86.5 |
| 2015/0174976 A1 * | 6/2015 | Shahroodi | ............ | B60D 1/1675 |
| | | | | 16/31 R |
| 2015/0174977 A1 * | 6/2015 | Shahroodi | ........... | B60B 33/0028 |
| | | | | 16/31 R |
| 2016/0332649 A1 * | 11/2016 | Buttimer | ................... | B62B 1/24 |
| 2021/0086813 A1 * | 3/2021 | Yifrah | ..................... | B62B 3/001 |
| 2022/0194455 A1 * | 6/2022 | Shimotani | ............ | B62B 5/0026 |

OTHER PUBLICATIONS

International Search Report for PCT/IL2018/051376; dated Mar. 25, 2019; 3 pages.
Written Opinion of the International Searching Authority for PCT/IL2018/051376; dated Mar. 25, 2019; 4 pages.

* cited by examiner

STEERABLE MULTI-TERRAIN CART AND METHOD THEREFOR

FIELD OF THE INVENTION

The present invention relates to the field of transportation implements, such as for the transportation of agricultural products. More particularly, the invention relates to a steerable multi-terrain cart and a method therefor.

BACKGROUND OF THE INVENTION

The transportation of postharvest agricultural products is challenging for several reasons. Firstly, the weight of the harvested products is significant, often on the order of tons, and the cart or other transporting vehicle has to be sufficiently sturdy and stable to carry the load. Thus the transporting vehicle requires at least four wheels. Secondly, there is a narrow space between each pair of plantation rows at many agricultural surroundings, such as within greenhouses, and the ability to turn the loaded and elongated transporting vehicle directly from one row to another is impractical due to its large turning radius. The loaded transporting vehicle generally has to travel to a large-area clearance distant from the agricultural site in order to turn around due to the large turning radius, requiring inefficient time utilization. Thirdly, the terrain of the agricultural site, such as mud and sand, which is traversed by the transporting vehicle is often sinkable, or is uneven, and the tire mounted on each wheel often needs to be independently driven to ensure that the transporting vehicle will traverse the existing terrain. Thus a swivel wheel which may assist in reducing the turning radius on level and unsinkable terrain is unsuitable for use in sinkable or uneven terrain as it cannot be independently driven, and also lacks the tractive performance to ensure a reliable turning movement along the sinkable or uneven terrain.

It is an object of the present invention to provide an elongated transporting vehicle that is able to turn directly from one plantation row to another at an agricultural site, while loaded.

Other objects and advantages of the invention will become apparent as the description proceeds.

SUMMARY OF THE INVENTION

A multi-terrain cart comprises a cart body, two front and two rear non-pivoting wheels, a swivel wheel positioned forwardly or rearwardly to said front and rear non-pivoting wheels, respectively, an actuator for applying a downward force to said swivel wheel which causes said swivel wheel to be set at an operative position and two of said non-pivoting wheels to be raised relative to an underlying ground surface, and means for setting an angle of said swivel wheel relative to a lengthwise extending centerline of said cart body to cause said cart to rotate about a center of rotation that is determined by said set angle of said swivel wheel.

The actuator is operable to apply a sufficiently high downward force to cause the swivel wheel to be pressed against an underlying ground surface and two of the non-pivoting wheels to be lifted above the underlying ground surface, such that the cart contacts the underlying ground surface by the swivel wheel and by two of the non-pivoting wheels that have not been lifted to achieve three point contact.

The actuator may be:
spring-biased;
a motor with a mechanical transmission that converts rotation of a shaft of the motor to linear displacement, the linear displacement serving to cause downward displacement of the swivel wheel; or
a hydraulic or pneumatic actuator comprising a piston to which the swivel wheel is kinematically connected, the piston serving to cause downward displacement of the swivel wheel.

By virtue of the novel apparatus, the multi-terrain cart is afforded a shortened turning radius relative to prior art apparatus even though it has a cart body length ranging from 2-7 meters and is adapted to carry a heavy load of hundreds of kilograms or even several tons. Thus, in response to an applied lateral force to the cart body, the cart is rotatable about the center of rotation that is determined by an angle of the swivel wheel relative to the centerline of the cart body equal to approximately 90 degrees and that is coincident with the cart body. Also, the cart has a turning radius from the center of rotation that is no more than 1.5 times a length of a wheelbase of the cart body when the swivel wheel is set to an angle of approximately 45 degrees.

In one embodiment, the cart further comprises means for applying a lateral force to the cart body that causes said cart to rotate about a center of rotation which is responsive to the angle of said applied lateral force.

The multi-terrain cart may further comprise a fixed handle for manual propelling.

The swivel wheel, which may be rotatably mounted to a fork being rotatably mounted by a swivel joint to a plate to enable 360-degree directional movement, may be laterally centered to each pair of wheels.

The swivel wheel may have a smaller diameter than the non-pivoting wheels.

All non-pivoting wheels may be simultaneously propelled or individually propelled by an electric motor which is powered by a rechargeable battery.

A method for steering a multi-terrain cart adapted to carry a heavy load comprises the steps of providing a cart body equipped with two front and two rear non-pivoting wheels, and a swivel wheel positioned forwardly or rearwardly to said front and rear non-pivoting wheels, respectively; applying a downward force to said swivel wheel until said swivel wheel is pressed against an underlying ground surface and two of said non-pivoting wheels are lifted above the underlying ground surface; setting an angle of said swivel wheel relative to a lengthwise extending centerline of said cart body; and applying a lateral force to said cart body to cause rotation of said cart about a center of rotation that is determined by said set angle of said swivel wheel.

The cart is able to rotate about the center of rotation that is determined by the set angle of the swivel wheel for an angular distance of less than 360 degrees, and also less than 180 degrees. The set angle of the swivel wheel is also able to be continuously adjusted during a turning operation.

DETAILED DESCRIPTION OF THE INVENTION

Figure 1:
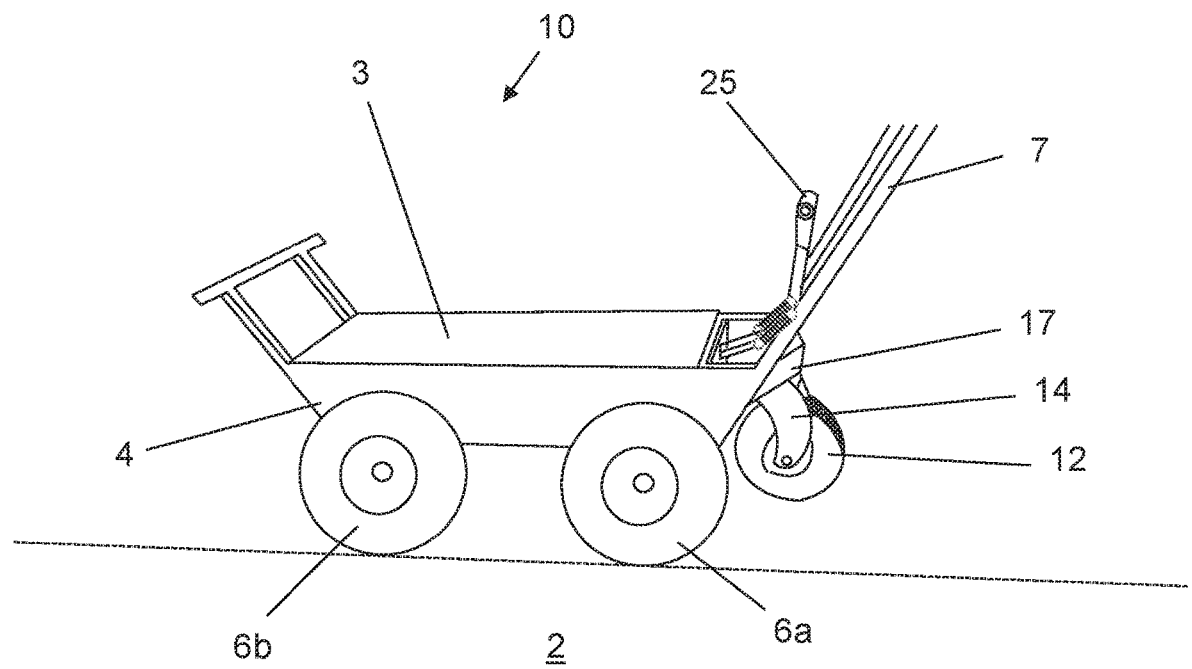
FIG. 1 is a perspective view of a multi-terrain cart according to an embodiment of the invention, showing an actuatable swivel wheel in an inoperative position.

FIG. 1 illustrates the steerable multi-terrain transporting vehicle (hereinafter referred to as a "cart") according to one embodiment of the present invention, which is generally indicated by numeral 10. Cart 10 comprises a platform 3 for carrying a heavy load of several tons or more, for example harvested agricultural products, a plurality of structural elements 4 including a frame or chassis, four non-pivoting wheels including rear wheels 6a and front wheels 6b that underlie platform 3 and are suitable for withstanding the heavy load, each of which including a corresponding tire with sufficient tractive performance to traverse sinkable or uneven terrain, and an inclined handle 7, generally fixed, for manually propelling cart 10. All non-pivoting wheels 6a and 6b may be driven (forward or rearward) simultaneously by an electric motor which is powered by a rechargeable battery (not shown), in order to provide all wheel drive (4×4). The electric motor may be controlled by buttons (not shown) that may be mounted on handle 7. Each of the wheels 6a and 6b may also be independently driven (e.g., by an individual motor and a rechargeable battery) to assist in propelling cart 10, particularly when traversing sinkable or uneven terrain.

In addition, cart 10 comprises a single swivel wheel 12, shown in an inoperative position located above underlying ground surface 2 along which cart 10 is adapted to traverse. Swivel wheel 12 is shown to be positioned rearwardly to the rear non-pivoting wheels 6a and laterally centered to each pair of wheels 6a and 6b, although it may also be positioned forwardly to the forward non-pivoting wheels 6b. A fork 14, to which a horizontal axle of swivel wheel 12 is rotatably mounted, is rotatably mounted in turn by a swivel joint to plate 17, e.g. a rectangular plate, to enable 360-degree directional movement. An actuator 25, which may be spring-biased, is adapted to set swivel wheel 12 to an operative position by which cart 10 is able to turn around with a reduced turning radius. Swivel wheel 12 is shown to have a smaller diameter than rear wheels 6a and front wheels 6b, but the invention is also applicable when swivel wheel 12 has the same diameter as rear wheels 6a and front wheels 6b.

Figure 2:
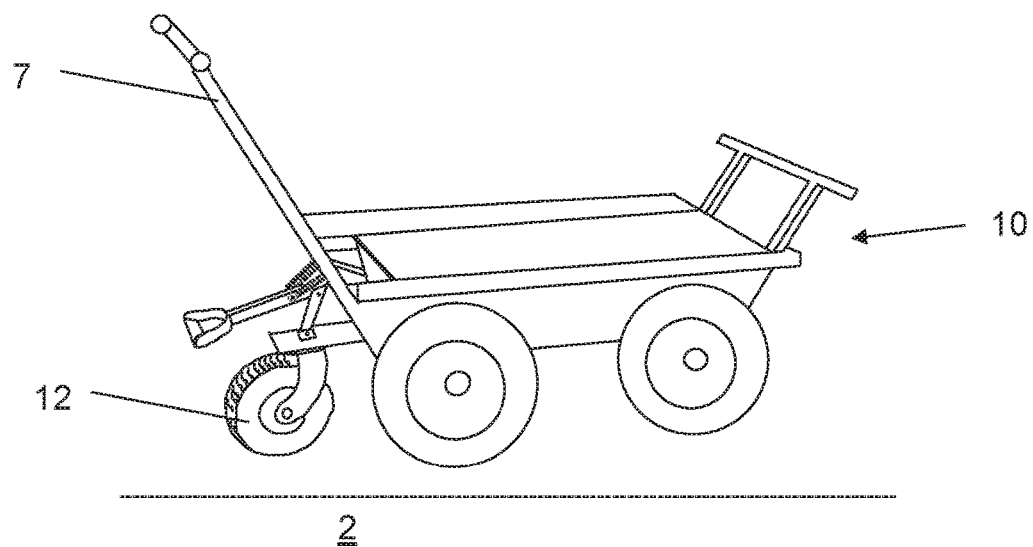
FIG. 2 is a perspective view of the multi-terrain cart of FIG. 1, showing the swivel wheel lowered relative to the inoperative position.

FIG. 2 illustrates cart 10 while swivel wheel 12 has been lowered with respect to ground surface 2.

Figure 3:
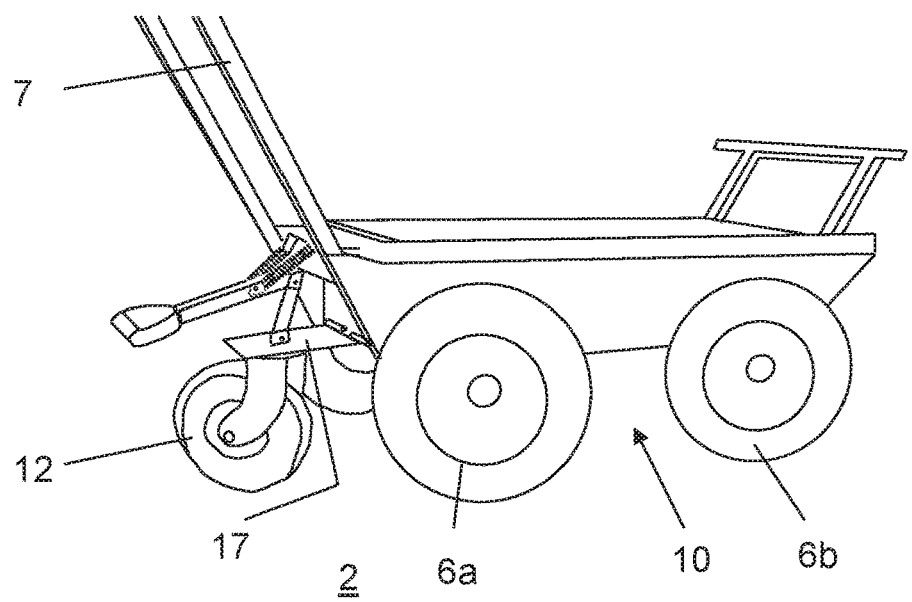
FIG. 3 is a perspective view of the multi-terrain cart of FIG. 1, showing the swivel wheel lowered to the operative position.

FIG. 3 illustrates cart 10 while swivel wheel 12 has been set to the operative position whereby plate 17 is substantially parallel to underlying ground surface 2. At this operative position, swivel wheel 12 is caused to be pressed against underlying ground surface 2 by a sufficiently high downward force that results in the lifting of rear wheels 6a above underlying ground surface 2, similar to the function of a jack. Cart 10 thus contacts ground surface 2 at the three points of swivel wheel 12 and the two front wheels 6b. When cart 10 is subsequently rotated by applying a lateral force to handle 7, the cart is advantageously able to be rotated about a rotation center that may be coincident with the cart body and with a turning radius that is significantly reduced with respect to prior art practice. Thus the clearance needed by cart 10 for a turning operation is also significantly reduced.

Figure 4:
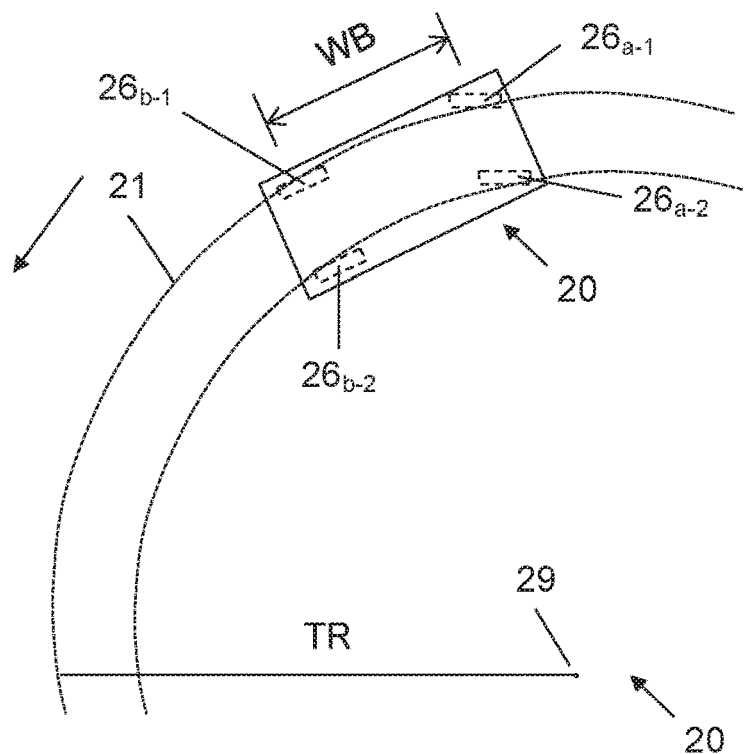
FIG. 4 is a schematic illustration of a turning radius of a prior art cart.

To appreciate the utility of the present invention, reference is first made to FIG. 4, which illustrates the turning radius TR of a prior art cart 20 having front pivoting wheels 26a-1 and 26a-2 and rear non-pivoting wheels 26b-1 and 26b-2. Turning radius TR is defined by the circular arc 21 traced by the outer front wheel 26a-1 and by center of rotation 29. The illustrated turning radius TR is the minimum turning radius as limited by the maximum steering angle of front wheels 26a-1 and 26a-2 of approximately 45 degrees, and will be increased if the steering angle is reduced. As can be seen, turning radius TR is approximately equal to three times wheelbase WB, or the distance between the centers of front wheels 26a-1 and 26a-2 and rear wheels 26b-1 and 26b-2, and center of rotation 29 is located outwardly from the vehicle body.

Figure 5:
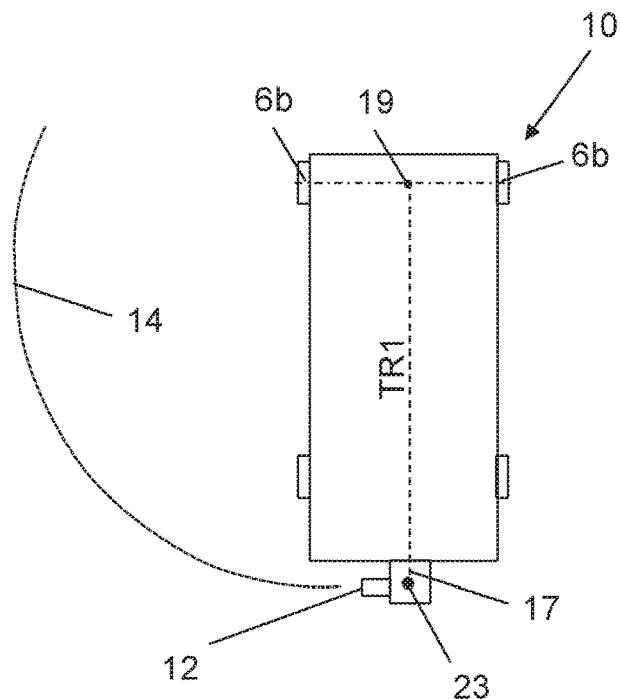
FIGS. 5 and 5A are two schematic illustrations, respectively, of the shortened turning radius of the cart of FIG. 1 relative to a prior art cart for different swivel wheel angles.

In contrast, in FIG. 5, the turning radius TR1 of cart 10 is equal to the distance between the centers of front wheels 6b, defining the center of rotation 19 of cart 10, and the swivel joint 23 of swivel wheel 12 which is mounted in plate 17. As the center of rotation 19 of cart 10 coincides with the body of cart 10, turning radius TR1 of cart 10 is significantly shorter than the turning radius TR of a prior art cart. Following application of a lateral force to the handle of cart 10, swivel wheel 12 is urged to swivel an angular distance of approximately 90 degrees, from an orientation parallel to turning radius TR1 to an orientation substantially perpendicular thereto. Thus cart 10 advances along a path traced by circular arc 14 coinciding with swivel wheel 12 and swivel joint 23.

It is appreciated that the turning radius of cart 10 is significantly reduced with respect to prior art practice even when its center of rotation 28 is located outwardly from the cart body.

Figure 5A:
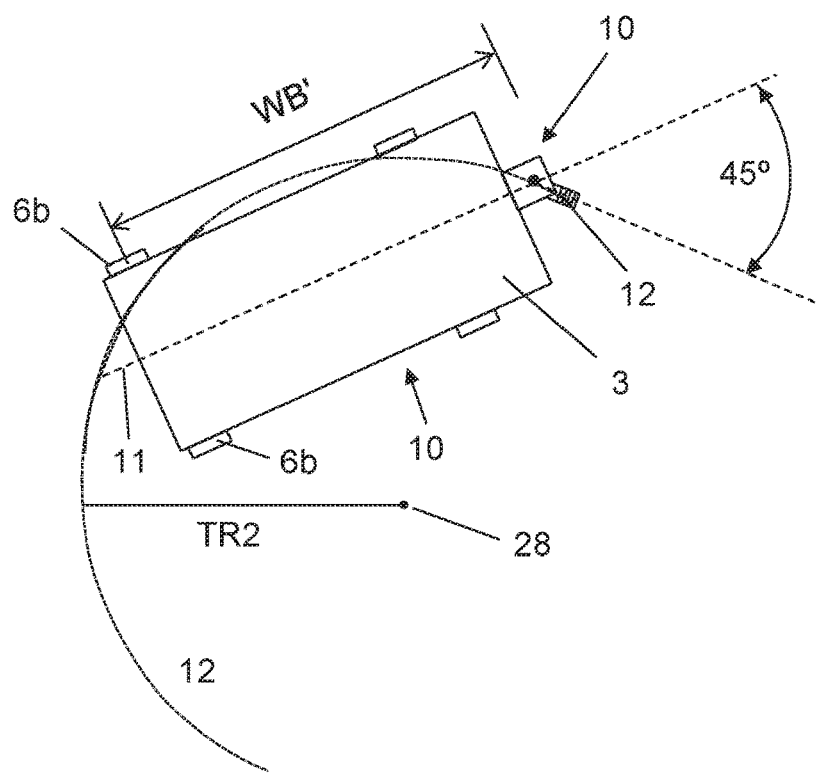

As shown in FIG. 5A, turning radius TR2 of cart 10 is approximately equal to 1.3 times wheelbase WB', or the distance between the centers of front wheels 6b and swivel wheel 12, and is no more than 1.5 times wheelbase WB', when the latter is set to an angle of 45 degrees relative to a lengthwise extending centerline 11 of platform 3.

When swivel wheel 12 is set the lowered operative position and a lateral force is applied to the cart body by means of handle 7 (FIG. 2), the swivel wheel angle is automatically adjusted in response to the angle of the applied lateral force.

Figure 10:
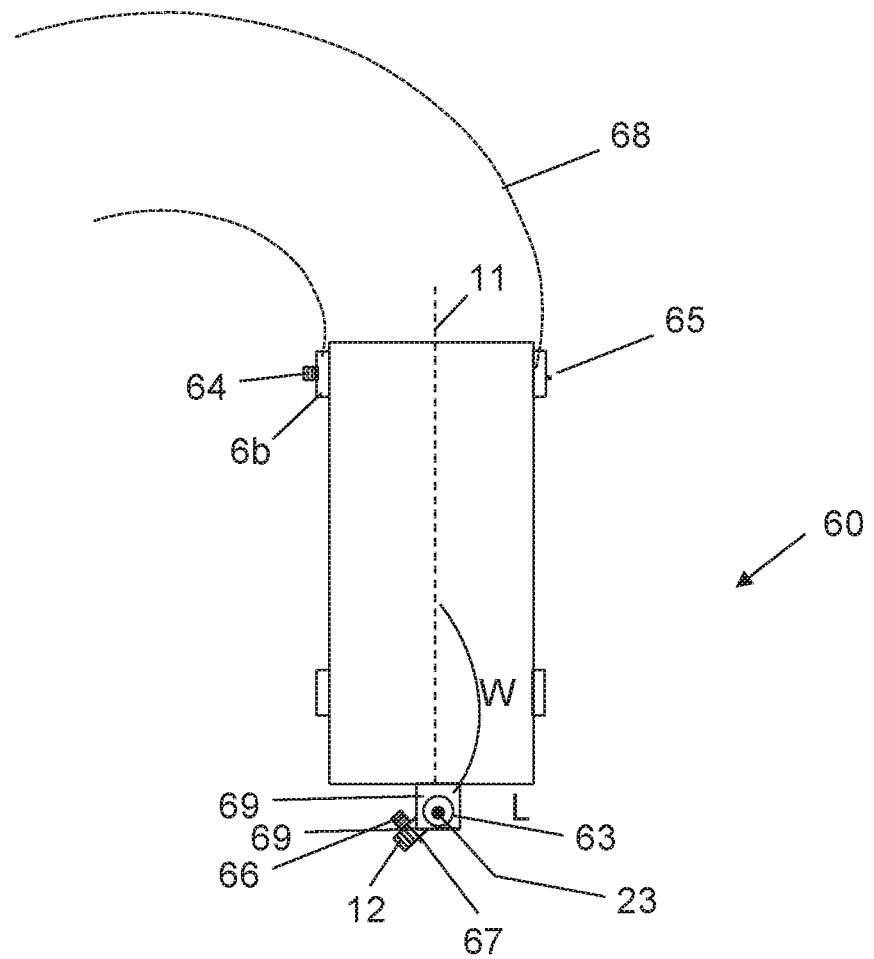
FIG. 10 is a schematic, top view of another embodiment of a multi-terrain cart.

In another embodiment shown in FIG. 10, the swivel wheel angle W relative to centerline 11 may be set by an electric motor 63 mounted on the body of cart 60 and configured to cause rotation of swivel joint 23.

Another electric motor 66, which may be mounted on the fork of swivel wheel 12, is configured to cause rotation of horizontal axle 67 with which swivel wheel 12 is fixed. Upon operation of electric motor 66, lateral force L is applied to cart body 69, the direction of which depending on swivel wheel angle W, to cause cart 60 to rotate about the swivel wheel angle dependent center of rotation and along schematically illustrated path 68. As referred to herein, an applied "lateral force" is directed perpendicularly to centerline 11 or a component thereof is directed perpendicularly to centerline 11. If cart 60 is not equipped with electric motor 66, or if electric motor 66 is not operated, the lateral force may be applied manually, such by a means of a fixed implement.

A third electric motor 64 may be mounted on one or more of the non-pivoting wheels, such as front wheel 6b, in order to rotatably drive, for example, the axle 65 to which front wheel 6b is fixed.

One or more of motors 63, 64 and 66 may be operated by a remote control device, or by cart-mounted selector or input elements.

The downward force applied by the actuator to swivel wheel 12 forces the latter to remain in contact with the underlying ground surface despite any ground undulations, and therefore improves cart stability during a turning operation. When the underlying ground surface is slightly sinkable, such as having a shallow thickness of approximately 10 cm due to the presence of mud, the applied downward force causes swivel wheel 12 to contact a rigid ground surface underlying the shallow sinkable region in preparation of a turning operation.

Figure 6:
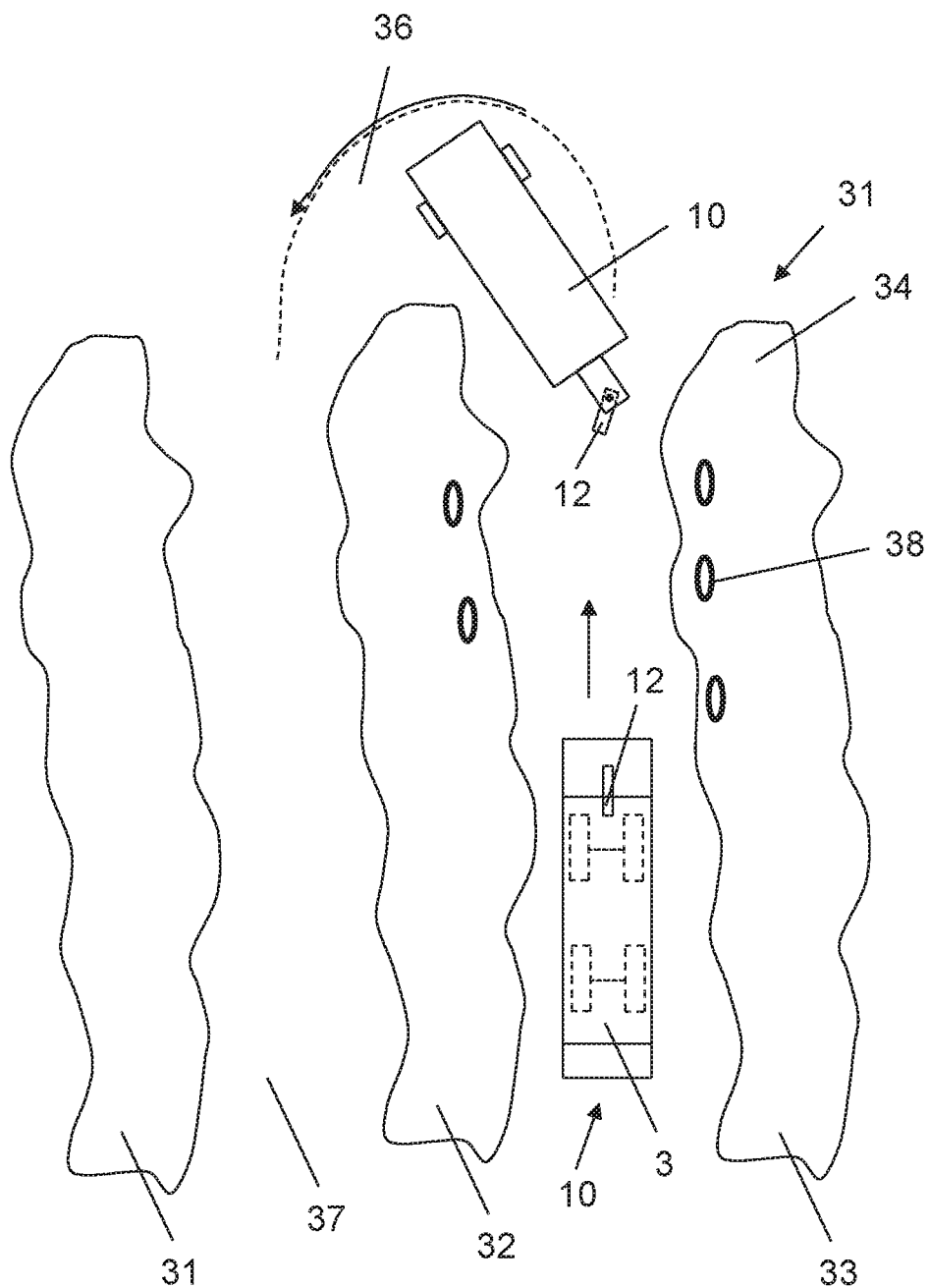
FIG. 6 is a schematic illustration of a turning operation that is able to be carried out by the cart of FIG. 1.

A turning operation that is able to be carried out by virtue of the configuration of cart 10 with swivel wheel 12 is schematically illustrated in FIG. 6. Agricultural site 31 is shown to have three plantation rows 31-33, and the space 37 between adjacent rows is only slightly greater than the width of cart 10, and therefore does not permit cart 10 to turn around within a space 37. Agricultural products 38 are able to be harvested from two adjacent plantation rows while cart 10 is positioned within a space 37 therebetween, whether swivel wheel 12 is oriented forwardly or rearwardly, and to be placed on top of platform 3. While cart 10 advances within space 37, swivel wheel 12 is raised to the inoperative position and rear wheels 6a and front wheels 6b are in contact with the underlying ground surface. When loaded cart 10 approaches an extremity 34 of a plantation row 33, swivel wheel 12 is set to the operative position, and cart 10 performs a turning operation with a relatively short turning radius at clearance 36 immediately beyond extremity 34, allowing cart to access another space between two adjacent plantation rows.

Figure 7:
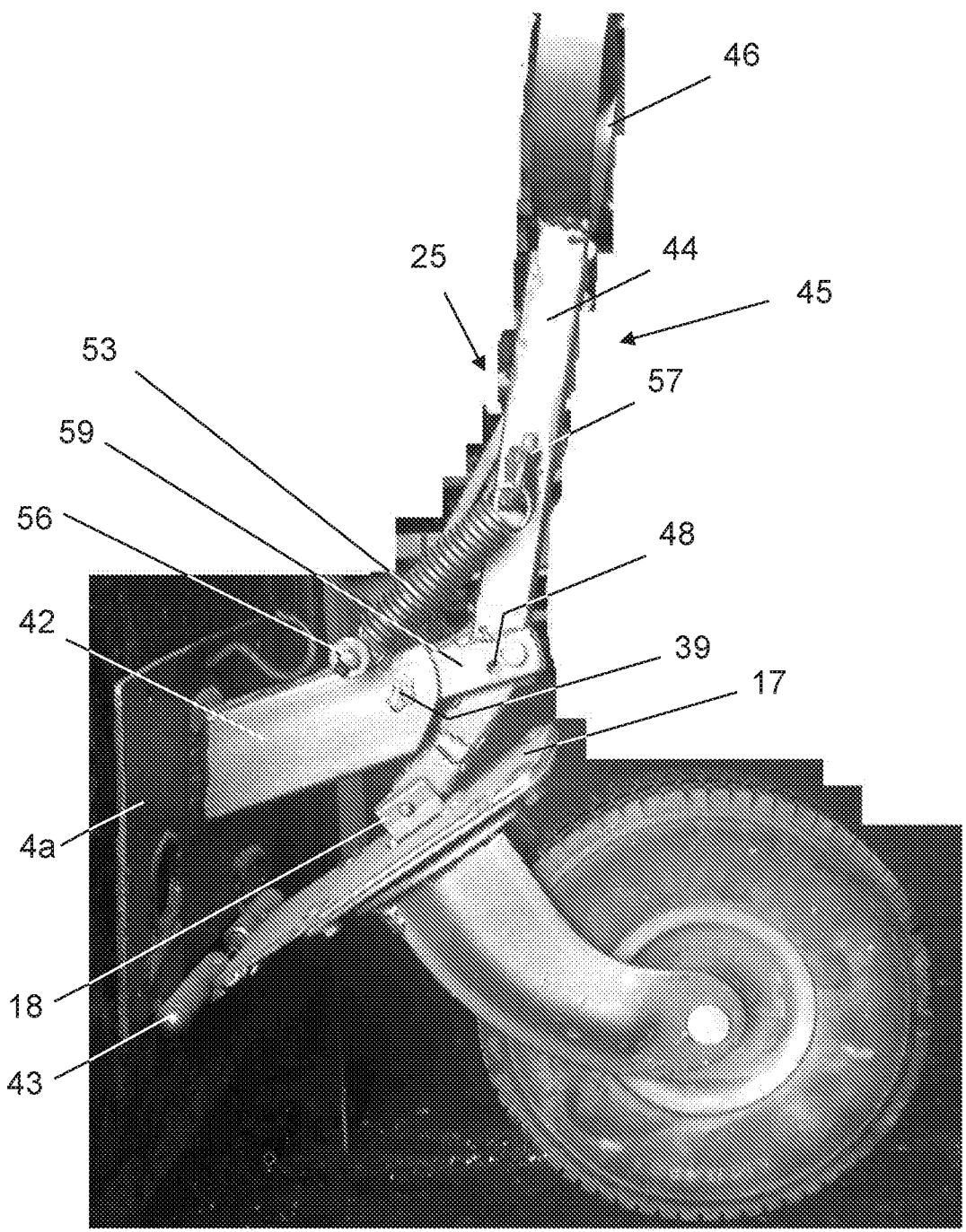
FIG. 7 is a perspective view of a linkage provided with the cart of FIG. 1 which is adapted to apply a downward pressing force, shown in an inoperative position.
Figure 8:
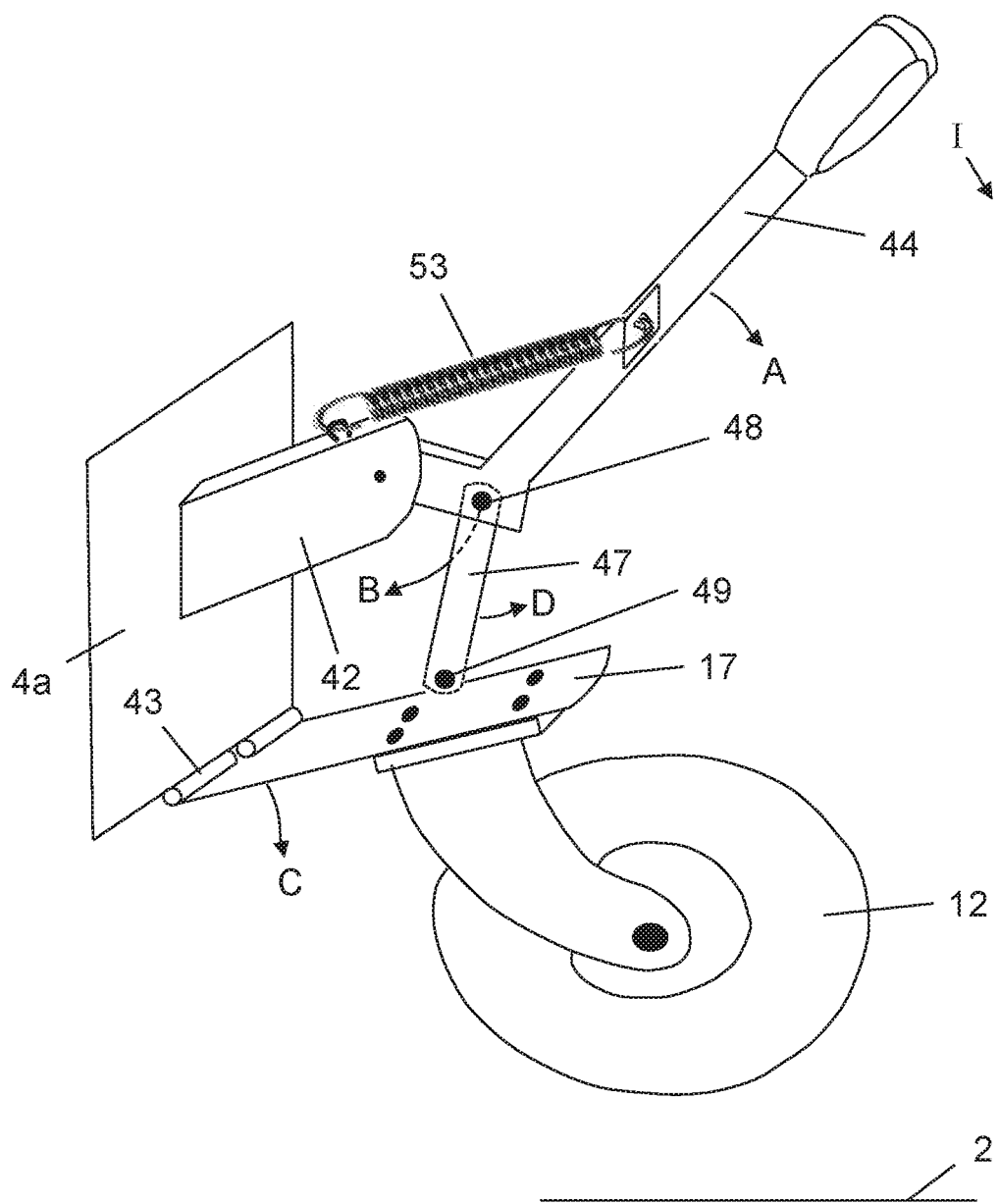
FIG. 8 is a perspective view of the linkage of FIG. 7, shown in an intermediate pivoted position.
Figure 9:
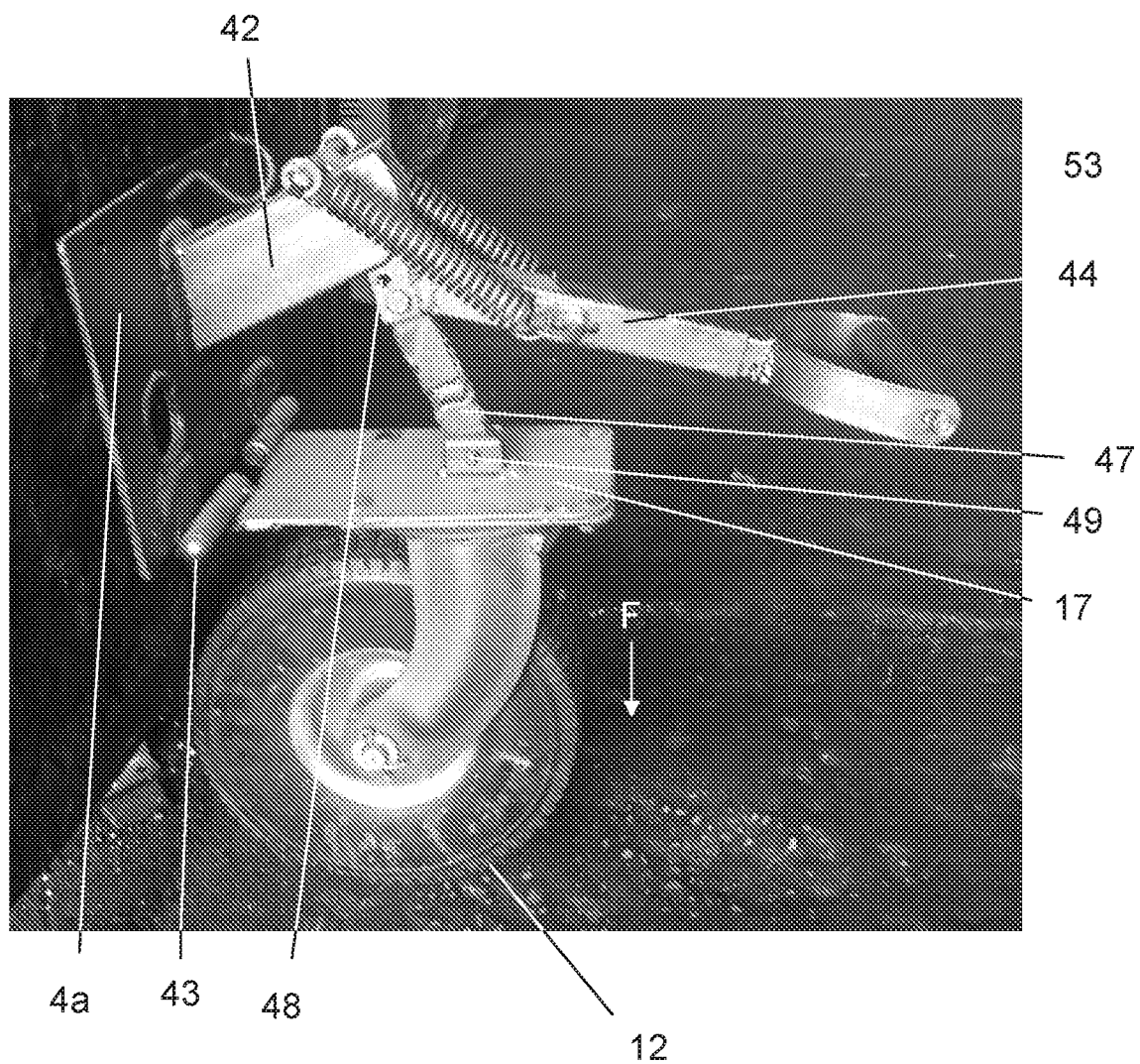
FIG. 9 is a perspective view of the linkage of FIG. 7, shown in an operative position.

Reference will now be made to FIGS. 7-9, which illustrate the operation of linkage 45 to apply a downward pressing force by means of plate 17 for setting swivel wheel 12 to the operative position, in conjunction with manual actuator 25 functioning as an input link. Linkage 45 can be inexpensively manufactured and reliably operated.

Linkage 45 comprises a fixed link 42, which is characterized by a pair of parallel bars fixed to vertical structural element 4a so as to upwardly and slightly obliquely extend therefrom. Manual actuator 25 is configured with a link 44 which is pivotally connected to link 42 by fixed pivot 39 passing through both bars of link 42, and with terminal D-grip handle 46 which is graspable by a user when applying an input force to the linkage. A third link 47, which is mutually parallel to links 42 and 44, is pivotally connected to an intermediate region of link 44 and to a pair of lugs 18 projecting upwardly from an intermediate region of plate 17 by floating pivots 48 and 49, respectively. Lugs 18 may, but not necessarily, coincide with swivel joint 23 (FIG. 5). Plate 17 is turn is pivotally connected to structural element 4a by one or more hinges 43, which are located below fixed link 42 and are mutually parallel to pivots 39, 48 and 49.

A compression spring 53, preventing unwanted movement of actuator 25 at both the inoperative and operative positions, is connected to an intermediate region of both fixed link 42 and pivoting link 44 at connection points 56 and 57, respectively. Connection point 57 is located above pivot point 48. To facilitate use of a compression spring 53 with a longer length, manual actuator 25 may also be configured with portion 59 that is angled with respect to link 44. Portion 59 may be integrally formed with link 44, or may connected thereto, such as by means of welding or fasteners. When actuator 25 is configured with angled portion 59, third link 47 may be pivotally connected to portion 59 at pivot point 48.

FIG. 7 illustrates linkage 45 at the inoperative position. At the inoperative position, one or more compression spring 53, e.g. two compression springs, is biased to retain link 44 of actuator 25 at an angle of approximately 110 degrees with respect to the upper edge of fixed link 42 to which the compression spring is connected at connection point 47. Also, plate 17 is inclined with respect to vertical structural element 4a by an angle of approximately 45 degrees, third link 47 is inclined with respect to vertical structural element 4a by an angle of approximately 30 degrees, and swivel wheel 12 is raised above underlying ground surface 2. If actuator 25 is inadvertently moved, spring 53 will cause actuator 25, as well as plate 17 and third link 47, to return to this inoperative position.

When a user applies an input force I in the direction of ground surface 2 to D-grip handle 46 that overcomes the biasing force of spring 53 and allows spring 53 to become extended to a maximum extent, link 44 is pivoted about pivot point 48 in the direction of arrow A to an angle of approximately 135 degrees with respect to the upper edge of fixed link 42, as shown in FIG. 8. The pivotal movement of link 44 in direction A causes link 47 to be pivoted in a similar rotational direction about pivot point 48 in the direction of arrow B to an angle of approximately 15 degrees with respect to vertical structural element 4a. At the same time, pivot point 48 is lowered by a distance of approximately 5 cm in response to input force I, causing plate 17 to pivot about hinges 43 in direction C to an angle with respect to vertical structural element 4a of approximately 70 degrees and swivel wheel 12 to be lowered with respect to floor surface 2. This pivotal displacement of plate 17 causes link 47 to be pivoted in direction D about pivot point 49. Swivel wheel 12 contacts floor surface 2 when plate 17 is disposed at an angle with respect to vertical structural element 4a of approximately 90 degrees.

As shown in FIG. 9, link 44 is able to be additionally pivoted to the operative position in direction A after spring 53 has been extended to the maximum extent shown in FIG. 8, to an angle of approximately 210 degrees with respect to the upper edge of fixed link 42, a total angular displacement of approximately 100 degrees. When link 44 is disposed in the operative position, link 47 is disposed at an angle of approximately −30 degrees with respect to vertical structural element 4a, after having been additionally pivoted in direction D about pivot point 49 in response to the additional lowering of pivot point 48 and the additional pivoting of plate 17 about hinges 43, as described above. Also, plate 17 is disposed at an angle with respect to vertical structural element 4a of approximately 110 degrees, as can be seen in FIG. 3. This angular disposition of plate 17 causes downward force F to be applied to swivel wheel 12, causing the latter to be downwardly displaced and pressed onto floor surface 2. Following pivotal displacement of plate 17 and downward displacement of swivel wheel 12, hinges 43, as well as the rear wheels of the cart, are caused to be raised to facilitate a turning operation, as described above.

As a result of this angular displacement of link 44, spring 53 has been once again compressed. If link 44 is inadvertently moved, spring 53 will cause link 44, as well as plate 17 and link 47, to return to the operative position.

Figure 11:
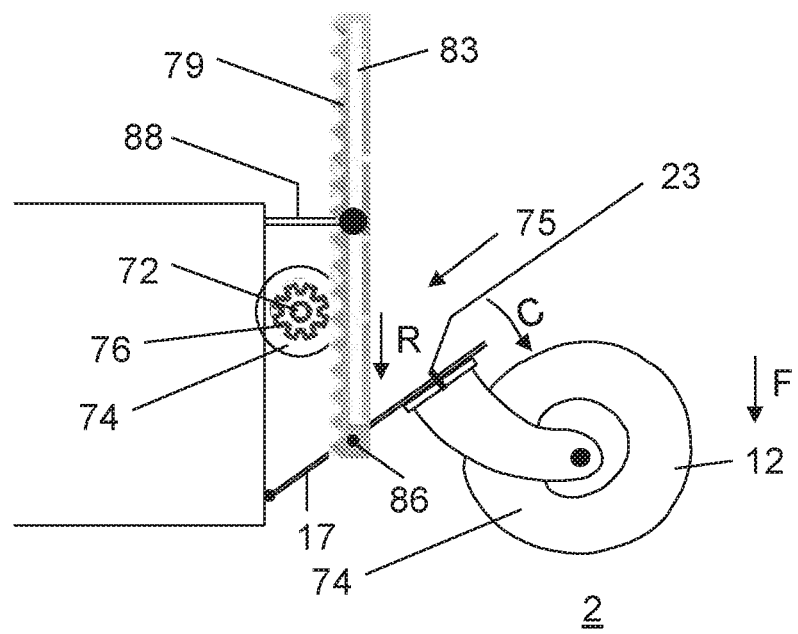
FIG. 11 is a side view of a portion of a multi-terrain cart, showing another embodiment of an actuator adapted to apply a downward pressing force onto a swivel wheel.

As shown in the embodiment of FIG. 11, the actuator 75 of cart 70 for applying a downward force to cause swivel wheel 12 to be pressed against an underlying ground surface comprises an electric motor 74 mounted on vertical structural element 4a, pinion 76 connected to the drive shaft 72 of motor 74, and a vertical rack 79 in toothed engagement with pinion 76. Rack 79 may be vertically displaceable within the interior of a guide 83, which is pivotally connected to the plate 17 to which swivel joint 23 of swivel wheel 12 is connected. Joint 86 pivotally connecting guide 83 to plate 17 is located at an intermediate region of the plate between hinge 43 connected to structural element 4a below motor 74 and swivel joint 23. Guide 83 is retained in a vertical orientation by means of a horizontal support 88 connected to both the guide and structural element 4a.

At the inoperative position, plate 17 is inclined with respect to structural element 4a and swivel wheel 12 is raised above underlying ground surface 2. When electric motor 74 is activated, by a remote control device or by a cart-mounted selector or input element, pinion 76 is rotatably driven and rack 79 engaged therewith is urged downwardly to apply force R onto joint 86. In response to the application of force R, joint 86 is lowered by a distance of approximately 5 cm and plate 17 is caused to pivot about hinges 43 in direction C. Swivel wheel 12 may contact floor surface 2 when plate 17 is disposed at an angle with respect to structural element 4a of approximately 90 degrees. Additional pivoting action of plate 17 will cause swivel wheel 12 to be pressed against floor surface 2.

It will be appreciated that other types of electrically activated actuators in conjunction with a mechanical transmission for converting rotary motion to linear displacement may also be employed.

Figure 12:
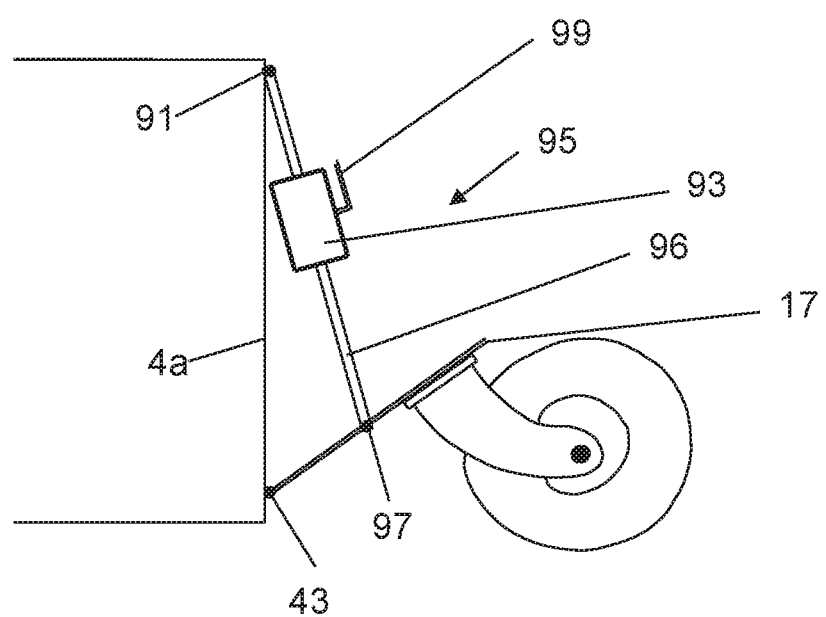
FIG. 12 is a side view of another embodiment of an actuator adapted to apply a downward pressing force onto a swivel wheel.

FIG. 12 illustrates hydraulic actuator 95 for causing the swivel wheel to be pressed against an underlying ground surface. Actuator 95 comprises cylinder 93 which is pivotally connected by joint 91 to vertical structural element 4a of a cart, and piston rod 96 which is linearly extendible or retractable with respect to cylinder 93. Piston rod 96 is pivotally connected by joint 97 to plate 17. Joint 97 is located at an intermediate region of the plate between hinge 43 connected to structural element 4a below joint 91 and the swivel joint connected to the swivel wheel. A conduit 99 through which hydraulic fluid is flowable extends to cylinder 93. The flow of hydraulic fluid through conduit 99 is controlled by a control module (not shown). In response to flow of the hydraulic fluid, piston rod 96 is extended to cause plate 17 to pivot about hinges 43.

A pneumatic actuator may be similarly configured.

While some embodiments of the invention have been described by way of illustration, it will be apparent that the invention can be carried out with many modifications, variations and adaptations, and with the use of numerous equivalents or alternative solutions that are within the scope of persons skilled in the art, without exceeding the scope of the claims.

The invention claimed is:

1. A multi-terrain cart, comprising
    a) a cart body;
    b) two front and two rear non-pivoting wheels;
    c) a swivel wheel positioned forwardly or rearwardly to said front and rear non-pivoting wheels, respectively;
    d) an actuator for applying a downward force to said swivel wheel which causes said swivel wheel to be set at an operative position and two of said non-pivoting wheels to be raised relative to an underlying ground surface; and
    e) means for setting an angle of said swivel wheel relative to a lengthwise extending centerline of said cart body to cause said cart to rotate about a center of rotation that is determined by said set angle of said swivel wheel, wherein a horizontal axle of said swivel wheel is rotatably mounted to a fork being rotatably mounted by a swivel joint to a plate connected to a structural element of said cart body, to enable 360-degree directional movement.

2. The multi-terrain cart according to claim 1, which, in response to an applied lateral force to the cart body, is rotatable about the center of rotation that is determined by an angle of the swivel wheel and that is coincident with the cart body, wherein the center of rotation that is determined by an angle of the swivel wheel coincides with the cart body when the angle of the swivel relative to the centerline of the cart body is equal to approximately 90 degrees.

3. The multi-terrain cart according to claim 1, further comprising means for applying a lateral force to the cart body that causes said cart to rotate about the center of rotation which is responsive to the angle of said applied lateral force.

4. The multi-terrain cart according to claim 1, wherein the means for setting an angle of the swivel wheel is an implement fixed to the cart body.

5. The multi-terrain cart according to claim 4, wherein the fixed implement is a handle.

6. The multi-terrain cart according to claim 1, in which the actuator is selected from the group of:
    a motor with a mechanical transmission that converts rotation of a shaft of the motor to linear displacement, the linear displacement serving to cause downward displacement of the swivel wheel; and
    a hydraulic or pneumatic actuator comprising a piston to which the swivel wheel is kinematically connected, the piston serving to cause downward displacement of the swivel wheel.

7. The multi-terrain cart according to claim 1, in which the swivel wheel is laterally centered to each pair of the front or rear wheels.

8. The multi-terrain cart according to claim 1, in which the actuator is operable to apply a sufficiently high downward force to cause the swivel wheel to be pressed against an underlying ground surface and two of the non-pivoting wheels to be lifted above the underlying ground surface, such that the cart contacts the underlying ground surface by the swivel wheel and by two of the non-pivoting wheels that have not been lifted to achieve three point contact.

9. The multi-terrain cart according to claim 1, which has a turning radius from the center of rotation that is no more than 1.5 times a length of a wheelbase of the cart body when the swivel wheel is set to an angle of approximately 45 degrees.

10. The multi-terrain cart according to claim 1, in which two or more of the non-pivoting wheels are drivable by an electric motor powered by a rechargeable battery.

11. The multi-terrain cart according to claim 10, in which all of the non-pivoting wheels are simultaneously or individually drivable by the electric motor.

12. A method for steering a multi-terrain cart adapted to carry a heavy load, comprising the steps of providing a cart body equipped with two front and two rear non-pivoting wheels, and a swivel wheel positioned forwardly or rearwardly to said front and rear non-pivoting wheels, respectively, wherein a horizontal axle of said swivel wheel is rotatably mounted to a fork being rotatably mounted by a swivel joint to a plate connected to a structural element of said cart body; applying a downward force to said swivel wheel until said swivel wheel is pressed against an underlying ground surface and two of said non-pivoting wheels are lifted above the underlying ground surface; setting an angle of said swivel wheel relative to a lengthwise extending centerline of said cart body; and applying a lateral force to said cart body to cause rotation of said cart about a center of rotation of up to 360 degrees that is determined by said set angle of said swivel wheel.

13. The method according to claim 12, wherein the cart rotates about the center of rotation that is determined by the set angle of the swivel wheel for an angular distance of less than 360 degrees or less than 180 degrees.

14. The method according to claim 13, wherein the cart having a cart body length of at least two meters and less than 7 meters rotates about the center of rotation that is determined by the set angle of the swivel wheel.

15. The method according to claim 12, wherein the set angle of the swivel wheel is continuously adjusted during a turning operation.

16. The method according to claim 12, wherein the downward force is applied to the swivel wheel by a manual actuator configured with a pivoting link which is pivotally connected to a fixed link of a linkage and which terminates with a user-graspable handle, the method further comprising the step of manually applying an input force to said handle in a direction of the underlying ground surface that causes said pivoting link to be pivoted in the direction of the underlying ground surface, a plate pivotally connected to a vertical structural element and to which the swivel wheel is rotatably mounted to be pivoted in the direction of the underlying ground surface, the downward force to be applied to the swivel wheel by means of said plate, and said swivel wheel to be pressed onto the underlying ground surface.

17. A multi-terrain cart, comprising:
a) a cart body that includes a platform for carrying a load;
b) two front and two rear non-pivoting wheels underlying said platform;
c) a swivel wheel positioned forwardly or rearwardly to said front and rear non-pivoting wheels, respectively;
d) an actuator for applying a downward force to said swivel wheel which causes said swivel wheel to be set at an operative position and two of said non-pivoting wheels to be raised relative to an underlying ground surface; and
e) means for setting an angle of said swivel wheel relative to a lengthwise extending centerline of said cart body to cause said cart to rotate about a center of rotation that is determined by said set angle of said swivel wheel,
wherein said actuator is a manual actuator configured with a pivoting link which is pivotally connected to a fixed link of a linkage, and wherein a compression spring is connected to an intermediate region of both said fixed link and said pivoting link to prevent unwanted movement of said manual actuator at both an inoperative position and the operative position.

18. The multi-terrain cart according to claim 17, wherein a horizontal axle of the swivel wheel is rotatably mounted to a fork being rotatably mounted by a swivel joint to a plate pivotally connected to a vertical structural element of the cart body, to enable 360-degree directional movement of the swivel wheel, wherein said plate is inclined with respect to the vertical structural element at the inoperative position and the downward force to said swivel wheel which causes said swivel wheel to be set at the operative position is applied by means of said plate.

19. The multi-terrain cart according to claim 18, wherein the linkage further comprises a third link which is pivotally connected to an intermediate region of the pivoting link and to a pair of lugs projecting upwardly from an intermediate region of the plate, the plate being pivotally connected to the vertical structural element by one or more hinges located below the fixed link.

20. The multi-terrain cart according to claim 19, wherein the plate is disposed at angle relative to the vertical structural element of approximately 90 degrees when the swivel wheel contacts the underlying ground surface and at an angle relative to the vertical structural element of approximately 110 degrees when set at the operative position.

\* \* \* \* \*